United States Patent [19]

Bingham

[11] Patent Number: 4,985,268

[45] Date of Patent: Jan. 15, 1991

[54] METHOD FOR PROCESSING PINEAPPLES

[75] Inventor: David W. Bingham, Brighton, Australia

[73] Assignee: Pitters Pty. Ltd., Australia

[21] Appl. No.: 447,510

[22] Filed: Dec. 7, 1989

[30] Foreign Application Priority Data

Dec. 9, 1988 [AU] Australia ................................ PJ1900

[51] Int. Cl.⁵ .............................................. A23L 1/00
[52] U.S. Cl. ..................................... 426/482; 426/518
[58] Field of Search ....................... 426/481, 482, 518; 99/569, 540

[56] References Cited

U.S. PATENT DOCUMENTS 4,761,291  8/1988  Neumann et al. .................. 426/482

*Primary Examiner*—George Yeung
*Attorney, Agent, or Firm*—Stevens, Davis, Miller & Mosher

[57] ABSTRACT

The invention relates to a method of and apparatus for processing pineapples. Pineapples are processed by initially slicing the pineapples into discs, grading the discs according to diameter, and then de-skinning and coring the discs. This process provides a more efficient arrangement since less usable fruit is lost during de-skinning. The apparatus includes a device for removing the ends of the pineapple, a grading device for grading discs according to diameter and a de-skinning and coring machine for treating the graded discs. The machine may include a series of circular cutters which may be rotatable and are operable to remove the skins of the discs while the discs are passed through the machine.

7 Claims, 6 Drawing Sheets

METHOD FOR PROCESSING PINEAPPLES

This invention relates to the processing of pineapple and particularly the process whereby the skin of the fruit is removed from the body of flesh. In more general terms, the invention is concerned with the preparation of pineapple for canning or other purposes.

Machinery has been developed to prepare pineapple by automatically removing the skin and the core to leave a cylindrical body of fruit flesh with a cylindrical bore through its centre. That machinery operates by first using a relatively large diameter tubular knife to remove the skin from the side of the fruit, the ends of the fruit are then removed by appropriate means to produce a square ended cylinder, after which the hard core of the fruit is removed by use of a smaller tubular knife. Those prior art processing steps are shown diagrammatically by FIGS. 1 to 4 of the attached drawings.

Figure 1:
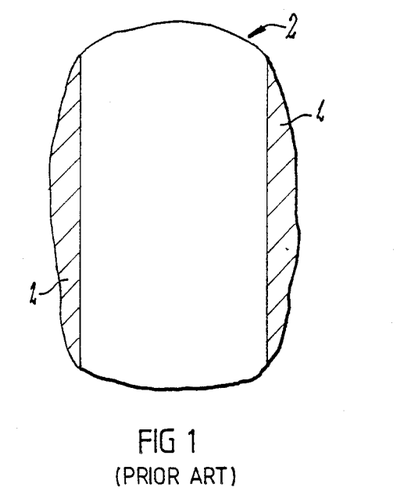
FIGS. 1 to 4 show a pineapple slicing process according to prior art.
Figure 2:
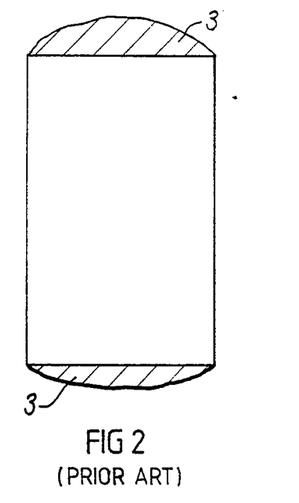
Figure 3:
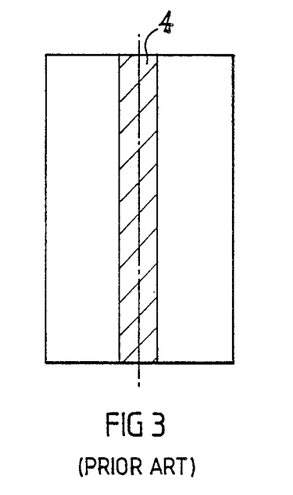
Figure 4:
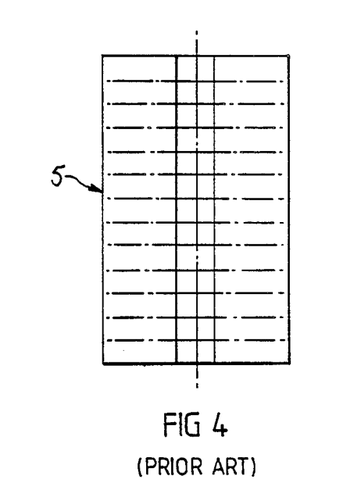

FIG. 1 shows the portion 1 of the pineapple 2 which is removed by the large diameter tubular knife, FIG. 2 shows the end portions 3 which are sliced off each end of the fruit, and FIG. 3 shows the core 4 which is removed using a smaller diameter tubular knife. FIG. 4 shows how the square ended hollow cylinder 5 is sliced after the fruit has been de-skinned in this manner.

A disadvantage of the foregoing technique is that a substantial quantity of otherwise usable flesh is lost in the skinning process. The initial cutting step as depicted by FIG. 1 is particularly wasteful because the cutting diameter selected is a compromise based on the somewhat elliptical shape of the fruit when viewed in side elevation. That is, a large cutting diameter will leave a large amount of skin at the ends so that end sections of substantial size will need to be removed, whereas a small cutting diameter will take the cut close to the core leaving only a small amount of recoverable flesh. It is found that up to 50% of the usable flesh is lost during these cutting steps.

An object of the present invention is to provide a method of processing which maximizes the amount of recoverable fruit. It is a further object of the invention to provide apparatus for carrying out that method.

According to one aspect of the invention there is provided a method of processing pineapple including the steps of, dividing the pineapple transversely of its longitudinal axis to form a plurality of separated discs, grading the discs according to diameter, and removing the skin of the fruit from the circumferential periphery of each disc.

According to another aspect of the invention there is provided apparatus for processing pineapple including, slicing means which is operable to divide a pineapple transversely into a plurality of separate discs, grading means which receives said discs and is operable to grade said discs according to their individual diameters, and skin removal means which is operable to remove the skin from the circumferential periphery of each individual disc.

In a typical situation, the discs may be roughly 1 inch thick, whereas it is normal to cut pineapple rings to a thickness of say ⅜ inch or ½ inch for canning purposes. Subsequently, each trimmed disc can be sliced to produce two or more rings of appropriate thickness or the discs may be cut into segments.

The process of the invention and an embodiment of the apparatus thereof are described in detail in the following passages of the specification which refer to the accompanying drawings. The drawings, however, are merely illustrative of how the invention might be put into efect, so that the specific form and arrangement of the various features as shown is not to be understood as limiting on the invention.

Figure 5:
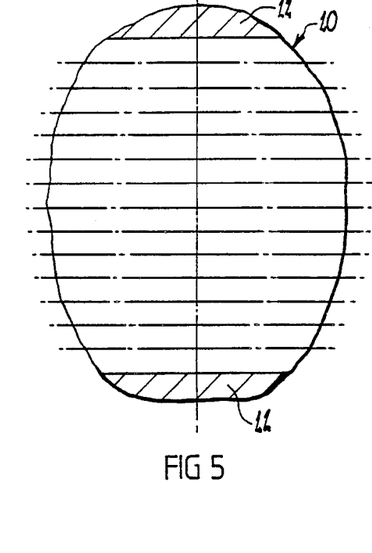
FIGS. 5 to 7 show diagrammatically the manner in which a pineapple is treated according to the process of the invention.
Figure 6:
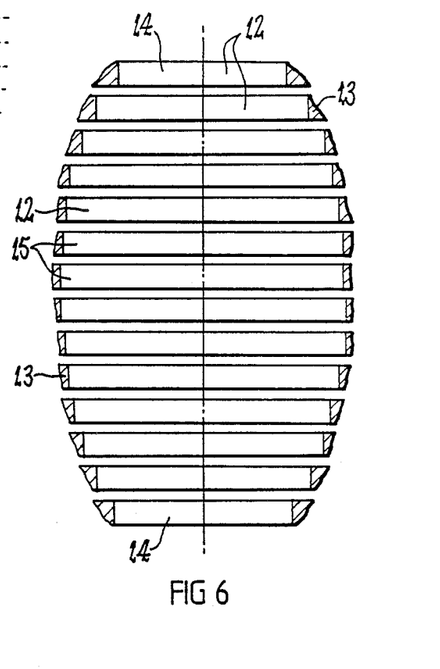
Figure 7:
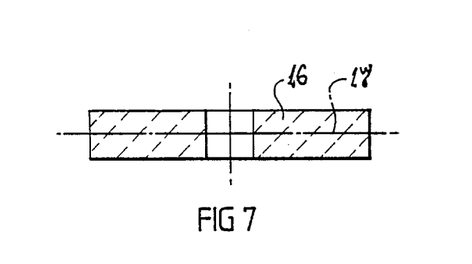

FIGS. 5 to 7 show diagrammatically the portions of the pineapple which are removed during processing. As shown, a pineapple 10 is of substantially oval or eliptical shape and as indicated in FIG. 5 has ends 11 (which are indicated by the hatched area in the drawing) which are preferably removed during initial stages of the processing. One preferred manner of removing those ends is depicted in FIG. 9 of the drawings.

The pineapple 10 is then sliced into discs 12 as indicated in FIG. 6, that is, the slicing into discs is done prior to the remaining skin being removed from the pineapple. The skin is depicted in FIG. 6 by the hatched areas 13. It will be noted that the discs 14 at the opposite ends of the pineapple are smallest, and the discs 15 towards the centre of the pineapple 10 are the largest. Thereafter the discs 12 are graded according to diameter by means of suitable grading apparatus, such as that shown in FIGS. 11 and 12, and the skin and core are then removed from the discs individually. This produces an annular fruit portion 16 as depicted in FIG. 7. The fruit portion 16 may be treated as required and may be canned in that form, or cut into segments, or sliced as indicated by dotted line 17. The disc 16 prior to treatment is preferably about 1 inch thick.

Figure 8:
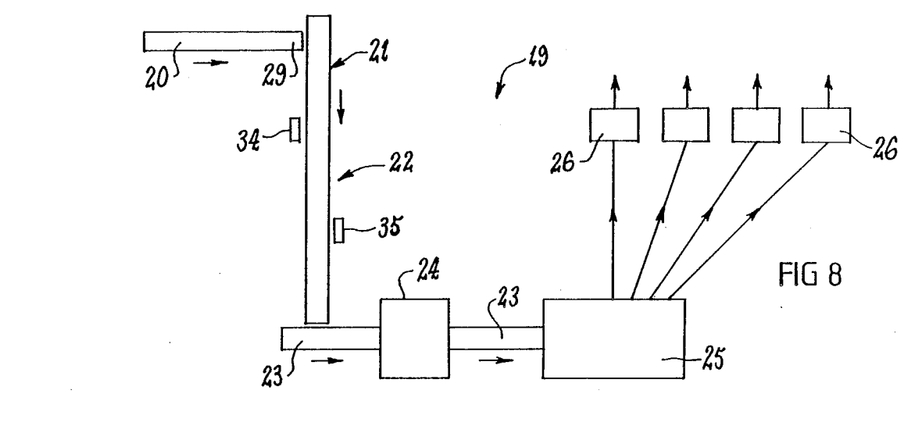
FIG. 8 shows diagrammatically the passage of a pineapple through apparatus in order that pineapples may be treated according to the process of the invention.

FIG. 8 depicts diagrammatically apparatus 19 for effecting the process referred to above with reference to FIGS. 5 to 7. The apparatus 19 includes a chute 20 for feeding pineapples onto a feed conveyor 21 past an end trimming station 22 and on to a second feed conveyor 23. The second feed conveyor carries the pineapples through a slicing device 24, and then the discs of pineapple thus sliced are graded in a grading station 25. The grading station separates the discs according to diameter, and the discs are then fed to a series of skinning and decoring machines 26. These different components of the machine are described in more detail herebelow.

Figure 9:
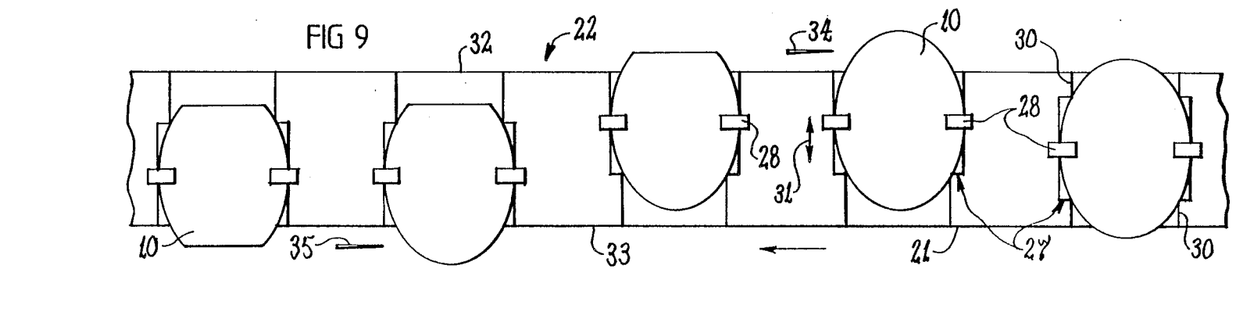
FIG. 9 shows diagrammatically a plan view of conveying apparatus and end slicing apparatus.

The feed conveyor 21 which shown in FIG. 9 is operative to transport the pineapples 10 through the end trimming station 22. The conveyor 21 which is depicted in more detail in FIG. 9 may be of the chain type or any other suitable type, and has a series of fruit carriers 27 located along its length in spaced relation. Each carrier 27 is designed to receive a single pineapple 10 with the longitudinal axis of the pineapple extending transverse to the direction of movement of the conveyor 21. A pair of gripping jaws 28 are associated with each carrier 27 and is operative to hold a pineapple 10 in the desired disposition on that carrier.

In the arrangement shown in FIG. 8, the pineapples are gravity fed to the feed conveyor 21 by way of the chute 2 which is designed to retain a group of pineapples 10 in end to end relationship. The lower end 29 of the chute is positioned to feed a leading pineapple onto a carrier 27 of the feed conveyor 21, and as the conveyor 21 moves, the other pineapples in the group are sequentially fed onto individual carriers 27 of the conveyor 21. The gripping jaws 28 of each carrier may be automatically actuated to grip a pineapple 10 as it arrives at the respective carrier 27.

Each carrier 27 may be mounted on slides 30, for example, so as to be movable relative to the conveyor 21 in a direction transverse to the conveyor movement. The direction in which the carriers 27 are able to move is depicted by arrow 31. Such transverse movement may be controlled by a cam system (not shown), or other suitable means, to cause each carrier to be moved first to one side 32 of the conveyor and then to the other side 33 as that carrier 27 is being transported through the end trimming station 22. When the carrier is at the extreme of each such lateral movement, a trimming knife 34, 35 operates to remove a respective end section of the fruit so as to result in the end trimmed product as shown by FIG. 5.

The end sections 11 which are removed in the foregoing manner may be transported to a juice extraction station (not shown).

If desired, the feed conveyor 21 maY be arranged to transport the fruit up a steep incline (not shown) such that any fruit not properly retained on a carrier will drop away to a collection zone. That may be done before or after the end trimming station.

Figure 10:
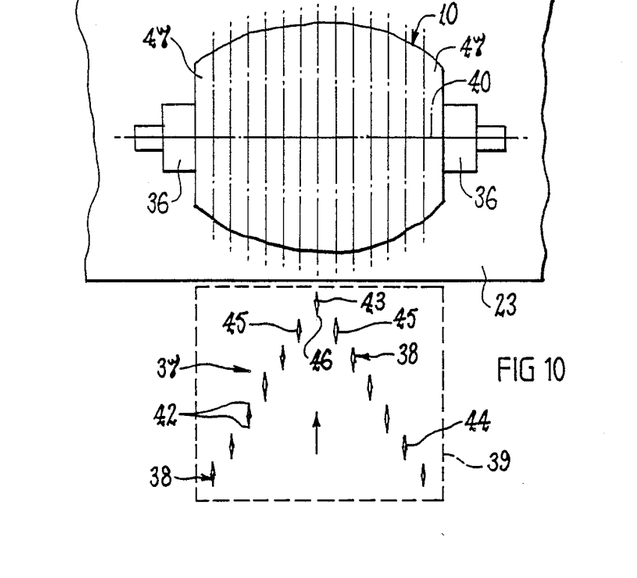
FIG. 10 shows diagrammatically a slicing blade configuration for the apparatus of the invention.

The feed conveyor 21 is arranged to discharge the end trimmed fruit 10 onto the second conveyor 23 which leads through the slicing station 24 at which each fruit is sliced to form separate discs as shown by FIG. 6. As shown in FIG. 10 each fruit 10 is preferably held by appropriate gripping means 36 as it is located at the slicing station 24, and that gripping means 36 is preferably automatically actuated. Substantially the same type of gripping means may be used in the slicing station 24 and on the feed conveyor 21. In a preferred arrangement, the gripped fruit 10 is held stationary within the slicing station 24 during the slicing operation.

Any suitable form of slicing knife may be used to cut the fruit into discs of appropriate thickness. In the arrangement shown in FIG. 10, there is a group of slicing knives 37 and each knife has an elongate blade 38 which is caused to reciprocate as it cuts through the fruit so as to effect a true slicing action. Other types of blades and cutting actions can be adopted to suit particular requirements. The lateral spacing between adjacent knives of the group is selected according to requirements and may be adjustable. In a typical situation, the spacing may be approximately 1 inch to thereby produce 1 inch thick fruit discs.

The group of slicing knives 37 is preferably mounted between parallel plates depicted by dotted lines 39. The blades 38 are preferably aligned transverse to the fruit axis 40 and the group of slicing knives 37 preferably reciprocates perpendicularly to the plane of the conveyor 23. The slicing knives 37 are caused to travel to the opposite side of the conveyor 23, i.e., in direction of arrow 41, in order to slice the fruit 10 into the discs 12. Slicing of the pineapple 10 can be done in both forward and reverse directions, and the cutting blades 38 have cutting edges 42 on both the front and back edges thereof.

It is preferred that the blades 38 are arranged so that there is sequential penetration of the fruit. In particular, the arrangement is preferably such that no portion of the fruit is subjected to significant compression between the blades 38 during the slicing action. Any such compression could spoil the appearance and quality of the sliced fruit.

In the arrangement shown diagrammatically by FIG. 10, the central blade 43 of the group 37 moves through the fruit in advance of the other blades 44. The other blades 44 are arranged in pairs, and each pair is in advance of and/or trailing another pair. It will be apparent that other arrangements of blades are possible to achieve the same result as described below.

The blades of the first pair 45 do not commence cutting the fruit until the central blade 43 has penetrated some distance into the fruit. In particular, the cutting edges 42 of the first pair 45 are spaced rearwardly from the trailing edge 46 of the central blade. As the first pair 45 penetrate into the fruit, the slot formed behind the central blade 43 is able to close thereby relieving compression which might otherwise occur in the sections of fruit between the two blades of the first pair 45. The same type of relief occurs as each subsequent pair of blades penetrates into the fruit. It is preferred that the blades of the group 37 retain substantially the same relative arrangement as they proceed through the fruit body so that the relief function is maintained during the entire slicing operation.

Movement of the blade group ceases after the last pair of blades emerges from the fruit body. At that time, the gripping means is deactivated to release the fruit and allow the separated discs to fall onto, or be moved onto, the conveyor belt 23.

The separated discs are then transported by the conveyor belt 23 to the grading station 25. Prior to reaching that station 25, however, the first and last or end disc 47 may be removed in any appropriate manner as it will generally be of sub-standard quality, either in terms of thickness or absence of skin residue.

Figure 11:
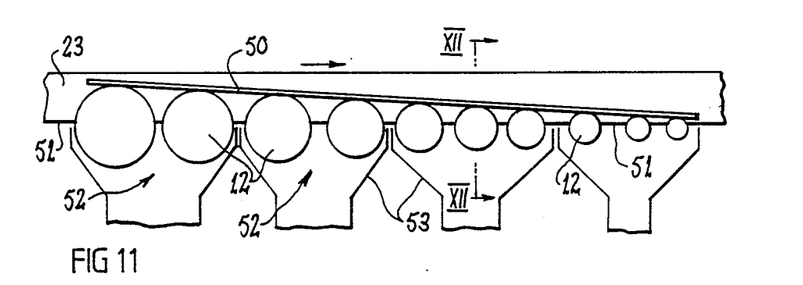
FIG. 11 shows a plan view of pineapple disc size sorting apparatus.
Figure 12:
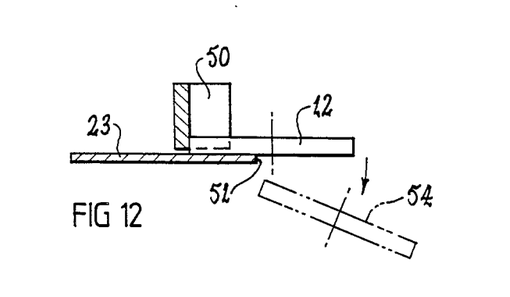
FIG. 12 shows a section view along line XII—XII in FIG. 9.

Any appropriate means may be adopted to grade the discs according to diameter. One relatively simple method is shown in FIGS. 11 and 12. The conveyor 23 is arranged to convey the discs 12 in single file along an angled deflector plate 50 which progressively pushes the discs towards one edge 51 of the conveyor belt 23. The larger diameter discs will be thereby caused to overbalance and fall as depicted by dotted lines 54 in FIG. 12 from the conveyor belt before smaller diameter discs, and the respective locations at which different diameter discs fall constitute individual grading zones 52. Each grading zone 52 is provided with a chute 53 which receives the discs 12 therein and leads those discs towards the skinning and decoring machines 26.

Figure 13:
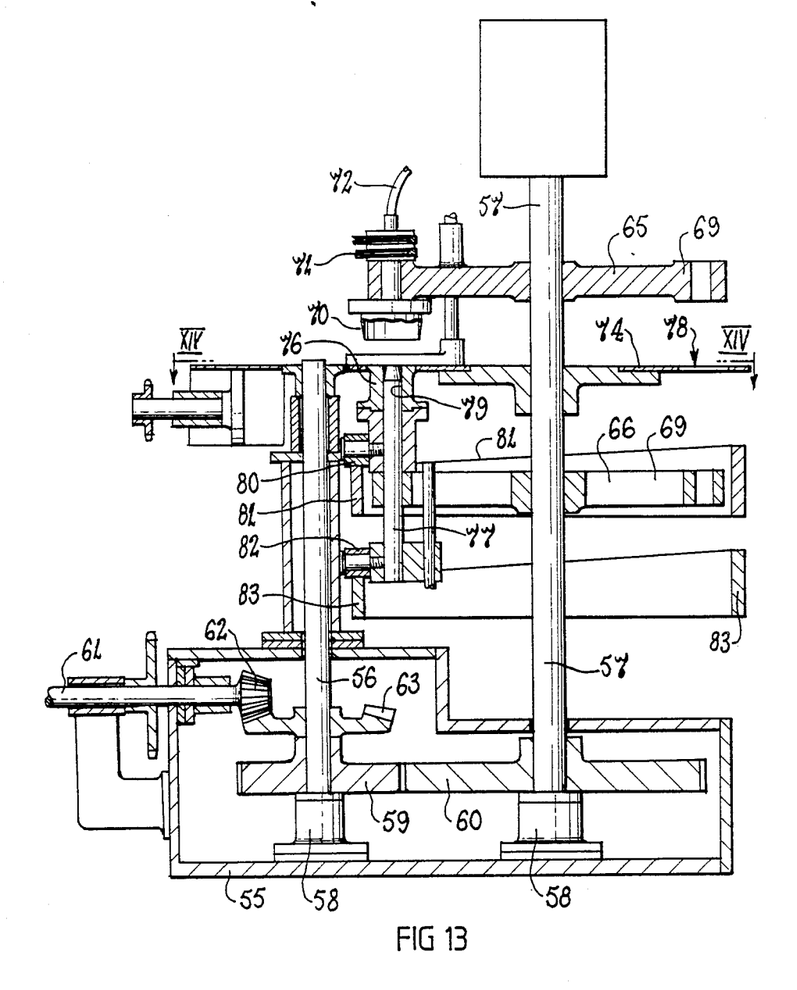
FIG. 13 shows in sectional side view a deskinning and coring apparatus for pineapple discs.
Figure 14:
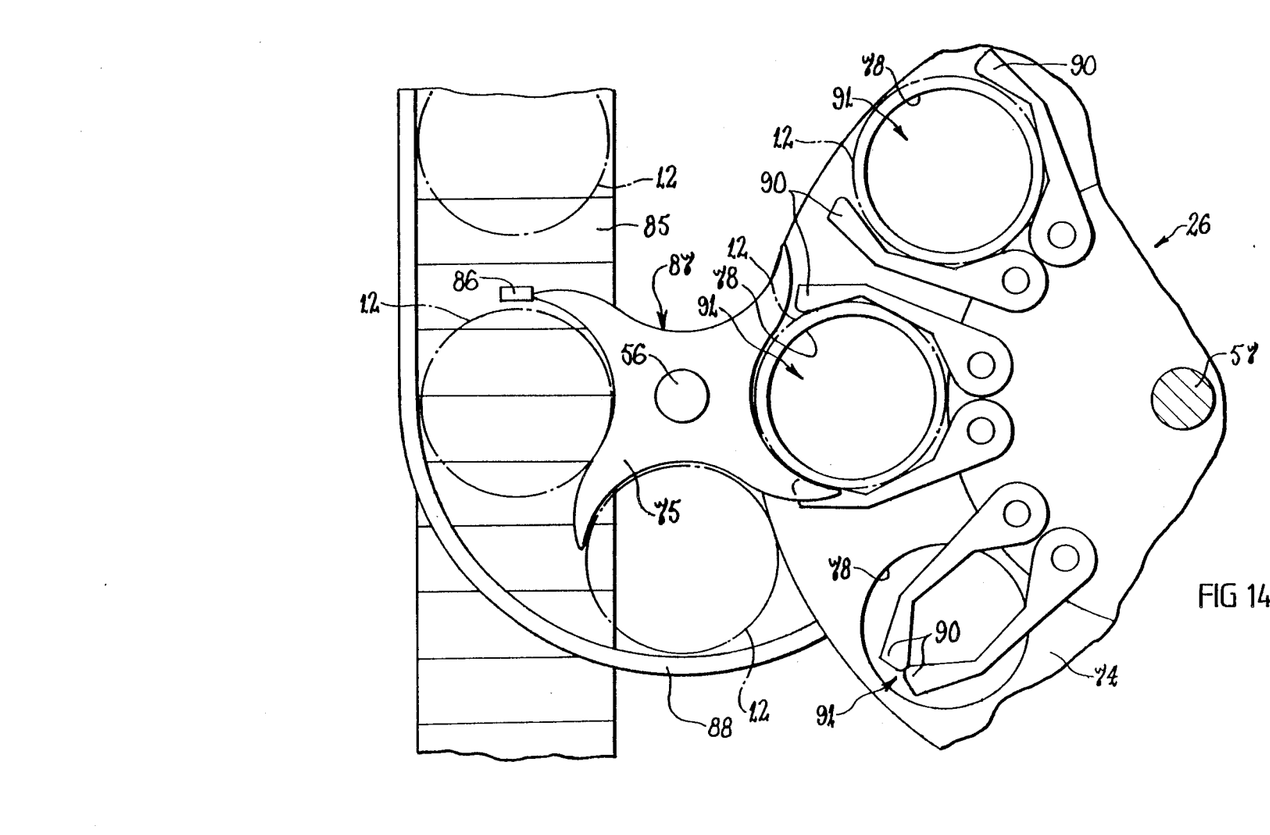
FIG. 14 shows a plan view of the apparatus shown in FIG. 13.

One preferred skinning and decoring machine 26 is shown in FIGS. 13 and 14. As shown, the machine 26 includes a base 55 which supports a pair of vertically extending shafts 56 and 57 in suitable bearings 58. The shafts 56 and 57 are in suitable bearings 58. The shafts 56 and 57 are rotationally interengaged through gears 59, 60 which are journalled to the shafts. The gear ratios 59, 60 are selected so that shaft 56 rotates at twice the speed of shaft 57. A drive shaft 61 is connected to a suitable motor (not shown) which drives the machine at an appropriate speed. A bevel gear 62 on the end of shaft 61 cooperates with a bevel gear 63 on shaft 56 to drive the two shafts 56 and 57.

The shaft 57 carries upper and lower spider brackets numbered 65 and 66 respectively. Each of those spider brackets 65, 66 has eight arms 69 which radiate outwardly from the shaft, the individual arms 69 being equidistantly apart. The upper spider bracket 65 carries eight tubular cutters 70 on the end of each arm, only one of those cutters being shown in the drawings. The cutters 70 face downwardly and are rotated by means of a belt and pully arrangement 71. Each cutter is supplied with pressurized air through supply line 72.

An annular table 74 is fixed to rotate with shaft 57 and is located between the upper and lower spider brackets 65, 66. Pineapple discs 12 are moved onto that table 74 by a spider wheel 75 which rotates with shaft 56, and will be described in detail with reference to FIG. 14.

A set of lifting devices 76 and a coring knife 77 are fixed to rotate with the lower spider bracket 66. There is a lifting device 76, and coring knife at the end of each of the arms 69 of the lower spider bracket 66 although only one such assembly is depicted in the drawings. Each lifting device arranged to pass through a respective opening 78 in the table 74, and the coring knife 77 passes up through an axial bore 79 in the lifting device 76.

The lifting device 76 carries a laterally extending roller 80 which rides on a circumferential cam 81. As the shaft 57 rotates the lifting device is caused to lift up by the cam, and thereby bring the pineapple disc carried thereon into engagement with the cutter 7. Likewise, the coring knife 77 carries a laterally extending roller 82 which rides on a circumferential cam 83 and, as the shaft 57 rotates, causes the coring knife 77 to lift and core the pineapple disc.

As shown in FIG. 14, pineapple discs 12 are supplied from the chutes 53 along a slat chain conveyor 85 which carries the substantially uniformly dimensioned discs to the skinning and decoring machine 26. The conveyor 85 carries timing lugs 86 which ensures the discs 12 are properly spaced along the conveyor 85.

The spider wheel 75 has four arcuate recesses 87 therein, and as the discs 12 arrive at the machine 26 they are received in one of those recesses 87 and guided onto the table 74. A curved guide plate 88 assists in this transfer. Each opening 78 in the table 74 is filled by a lifting device 76 and the upper surface 84 of the lifting device 76 is substantially flush with the upper surface of the table 74 when the pineapple discs 12 are received thereon. The upper surface 84 of each lifting device 76 thus defines a support surface for the pineapple discs 12, and when the lifting device 76 is raised the support surface 84 supports substantially the entire undersurface of the discs 12. The lifting device 76 preferably has a diameter which is just less than that of the cutters 70 so that the lifting device can fit into the interior of the cutters 70 during the de-skinning operation. A pair of automatically actuated gripping arms 90 are associated with each disc position 91 on the table 74, and those gripping arms 90 open to receive a disc 12 therebetween. It will be understood that there are eight disc positions 91 on the table 74, and there are four arcuate recesses 87 on the spider wheel 75. The spider wheel 75 rotates at exactly twice the speed of the table 74, and the components are dimensioned so that a disc 12 is received in each disc position 91 as the components rotate relative to each other.

Once the discs 12 are gripped by the arms 90 the skinning and coring will be done. As previously mentioned, the lifting device 76 will lift the discs 12 to engage the cutters 70, and simultaneously or thereafter the coring knife 77 will decore the disc. The coring knife will probably need to lift higher than the lifting device 76. Because the cutters 70 are rotating the skin from the discs 12 will spin off, and will be collected in suitable containers (not shown). The cores will pass down the centre of the coring knives 77.

Once the discs 12 have been de-skinned and cored they will be automatically removed from the table 74 by any suitable means (not shown) and will then be further sliced or segmented as discussed hereinbefore.

Assuming the discs are to be separated into two or more rings of a predetermined thickness, they can be fed by appropriate means to a further slicing station. That station may involve any suitable slicing means. In some cases, the discs or rings may be further divided by being cut into segments. Whatever the final form, whether it be rings or segments, the individual pieces of fruit may be conveyed to a syruper and can closing machine to complete the processing.

It will be appreciated from the foregoing description that the present invention provides an effective method and apparatus for treating pineapple such that there is minimum loss of edible fruit and there is minimum damage to the fruit during the treatment process.

Finally, it is to be understood that various alterations, modifications and/or additions may be introduced into the constructions and arrangements of parts previously described without departing from the spirit or ambit of the invention.

Having now described our invention what we claim as new and desire to secure by Letters Patent is:

1. A method of processing a pineapple including the steps of dividing the pineapple transversely of its longitudinal axis to form a plurality of separated discs, grading the discs according to diameter, conveying each graded disc to one of a plurality of tubular cutters, the cutter to which each individual disc is conveyed having a diameter a predetermined extend smaller than the diameter of the disc, and removing the skin of the pineapple from the circumferential periphery of each disc with the respective tubular cutter.

2. A method according to claim 1, wherein a portion is removed from each end of the pineapple prior to said dividing step.

3. A method according to claim 2, wherein a central core portion is removed from each said disc at substantially the same time as said skin removing step.

4. A method according to claim 1 wherein each disc is cut into segments subsequent to the core and skin being removed from the disc.

5. A method according to claim 3 wherein the discs are sliced to a thickness of approximately one inch during said dividing step, and after the skin and core have been removed, said discs are sliced in half along a slice line which is parallel to the two major faces of the disc and approximately midway between those faces.

6. A method according to claim 1 wherein the dividing of the pineapple is done sequentially by first beginning the cutting at one area and then, after said first cutting has proceeded at least part way through the pineapple, beginning a second cutting at a location on the pineapple that is spaced longitudinally from the first cutting so as to avoid compression of the fruit between closely adjacent cutting.

7. A method of processing pineapple including the steps of, dividing the pineapple transversely of its longitudinal axis to form a plurality of separated discs, then grading the discs according to diameter, then transferring each disc to one of a plurality of skinning machines, each said machine being capable of skinning discs of a certain graded diameter, and then by means of said machine removing the skin of the pineapple from the circumferential periphery of each disc.

* * * * *